United States Patent
Bender et al.

[11] Patent Number: 6,002,933
[45] Date of Patent: Dec. 14, 1999

[54] INTER-SYSTEM SOFT HANDOFF

[75] Inventors: Paul E. Bender; Toni L. Holcman; Gadi Karmi; Kuo-Chun Lee; Suzanne M. Lueder; Bibhu P. Mohanty, all of San Diego; Robert C. Ottinger, Encinitas; Roy F. Quick, Jr., San Diego; Steven P. Stachwick, Ramona; Todd Sutton, San Diego; Venkat Tangirala, San Diego; Noam A. Ziv, San Diego, all of Calif.

[73] Assignee: Qualcomm Incorporated, San Diego, Calif.

[21] Appl. No.: 08/845,944

[22] Filed: Apr. 29, 1997

[51] Int. Cl.⁶ ........................................... H04Q 7/20
[52] U.S. Cl. ............................................. 455/442; 455/524
[58] Field of Search ........................... 455/442, 436, 455/426, 454, 525, 453, 524, 443, 560, 404; 370/252, 253, 331, 332, 412

[56] References Cited

U.S. PATENT DOCUMENTS

| | | | |
|---|---|---|---|
| 3,925,782 | 12/1975 | Anderl et al. | 343/178 |
| 4,123,718 | 10/1978 | Lampert et al. | 325/474 |
| 4,222,115 | 9/1980 | Cooper et al. | 375/1 |
| 4,669,107 | 5/1987 | Eriksson-Lennartsson | 455/453 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,107,487 | 4/1992 | Vilmur et al. | 370/18 |
| 5,128,965 | 7/1992 | Henriksson | 375/58 |
| 5,179,571 | 1/1993 | Schilling | 375/1 |
| 5,184,347 | 2/1993 | Farwell et al. | 370/350 |
| 5,220,678 | 6/1993 | Feei | 455/69 |
| 5,245,629 | 9/1993 | Hall | 375/1 |
| 5,257,283 | 10/1993 | Gilhousen et al. | 375/1 |
| 5,265,119 | 11/1993 | Gilhousen et al. | 375/1 |
| 5,267,261 | 11/1993 | Blakeney et al. | 375/1 |
| 5,267,262 | 11/1993 | Wheatley, III | 375/1 |
| 5,293,643 | 3/1994 | Israelsson | 455/437 |
| 5,305,308 | 4/1994 | English et al. | 370/335 |
| 5,305,468 | 4/1994 | Bruckeert et al. | 455/69 |
| 5,313,454 | 5/1994 | Bustini et al. | 370/231 |
| 5,379,448 | 1/1995 | Ames et al. | 455/524 |
| 5,383,219 | 1/1995 | Wheatley, III et al. | 375/1 |
| 5,386,456 | 1/1995 | Schatz et al. | 455/436 |
| 5,388,102 | 2/1995 | Griffith et al. | 370/512 |
| 5,390,338 | 2/1995 | Bodin et al. | 455/33.1 |
| 5,450,616 | 9/1995 | Rom | 455/69 |
| 5,454,026 | 9/1995 | Tanaka | 455/437 |
| 5,465,399 | 11/1995 | Oberholtzer et al. | 455/69 |

(List continued on next page.)

FOREIGN PATENT DOCUMENTS

| | | | |
|---|---|---|---|
| 9312588 | 6/1993 | WIPO . | |
| 9406218 | 3/1994 | WIPO | H04B 7/005 |
| 9741698 | 11/1997 | WIPO . | |

*Primary Examiner*—Nguyen Vo
*Assistant Examiner*—Charles N. Appiah
*Attorney, Agent, or Firm*—Russell B. Miller; Brian S. Edmonston; Roger W. Martin

[57] ABSTRACT

A method and apparatus for operating a cellular telephone system that supports performing an inter-system soft handoff is described. A subscriber unit generates a pilot strength measurement report when the pilot channel from a base station is detected. When a base station controller receiving the pilot strength measurement report determines that the base station is part of a second cellular telephone system, a inter-system soft handoff request is generated. An admission control subsystem receives the inter-system soft handoff and either grants or denies the request base on the traffic level with the second cellular telephone system. In a preferred embodiment of the invention, the traffic level is determined based on link load messages received periodically by the admission control subsystem that are generated by an interface port coupled to an interconnect between the first cellular telephone system and the second cellular telephone system. The link load message include peak queue length and average frame rate information.

14 Claims, 3 Drawing Sheets

U.S. PATENT DOCUMENTS

| | | | |
|---|---|---|---|
| 5,487,180 | 1/1996 | Ohtake | 455/4.1 |
| 5,596,625 | 1/1997 | LeBlanc | 455/404 |
| 5,697,055 | 12/1997 | Gihousen et al. | 455/436 |
| 5,722,073 | 2/1998 | Wallstedt et al. | 455/437 |
| 5,754,945 | 5/1998 | Lin et al. | 455/436 |
| 5,781,861 | 7/1998 | Kang et al. | 455/442 |
| 5,794,149 | 8/1998 | Hoo | 455/438 |
| 5,796,722 | 8/1998 | Kotzin et al. | 370/252 |
| 5,826,188 | 10/1998 | Tayloe et al. | 455/428 |

FIG. 1

PRIOR ART

INTER-SYSTEM SOFT HANDOFF

BACKGROUND OF THE INVENTION

I. Field of the Invention

The present invention relates to wireless telecommunications. More particularly, the present invention relates to a novel and improved method and apparatus for performing conducting telephone calls or other communications between wireless telecommunications systems that supports inter-system soft handoff.

II. Description of the Related Art

Figure 1:
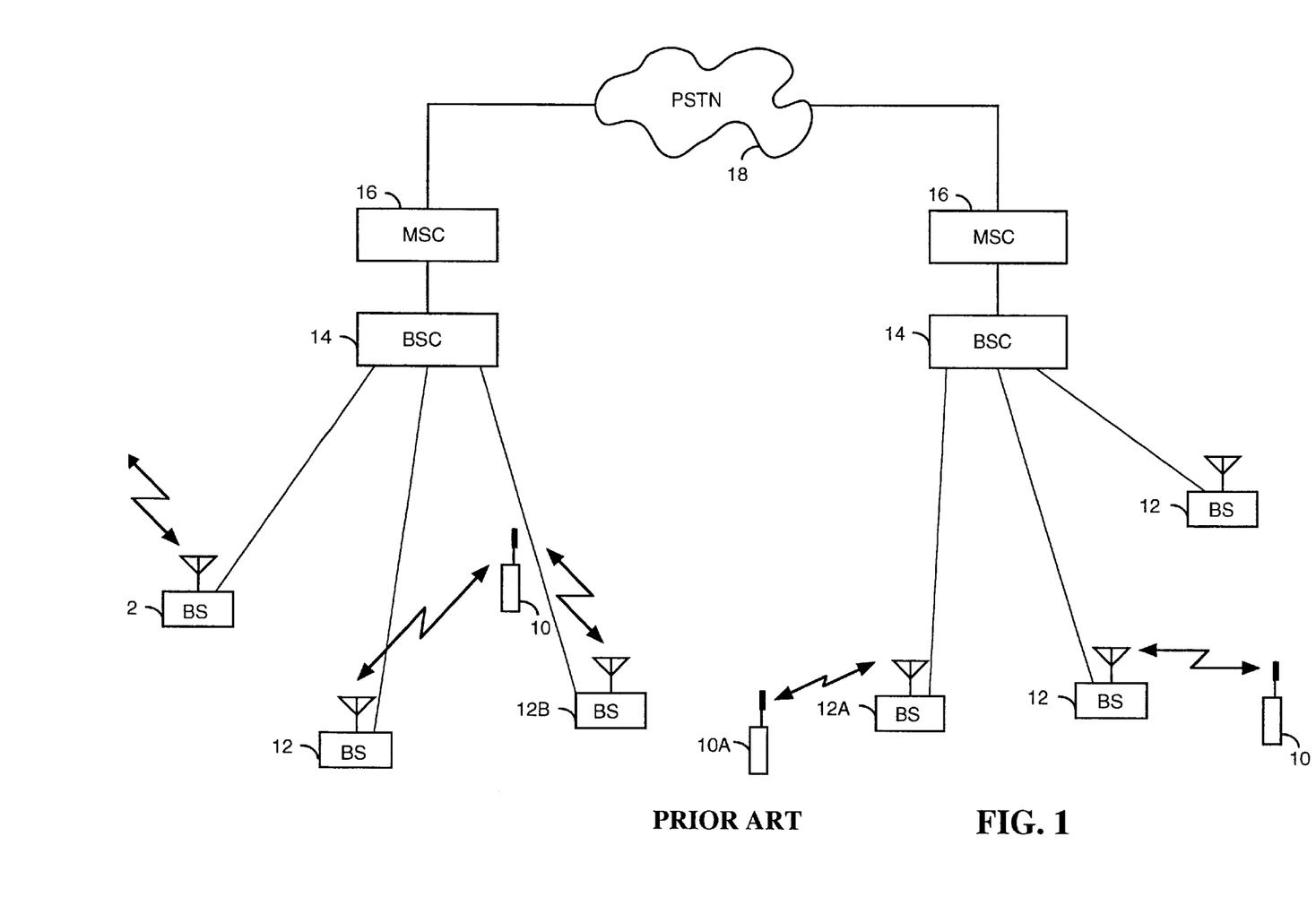
FIG. 1 is a block diagram of a set of cellular systems configured in accordance with the prior art.

FIG. 1 is a diagram of a cellular telephone system configured in accordance with the use of the IS-95 over-the-air interface standard. The IS-95 CDMA over the air interface standard (IS-95) promulgated by the Telecommunications Industry Association (TIA) defines a protocol for providing wireless telephone service via code division multiple access (CDMA) modulated RF signals. IS-95 has many derivatives and related standards including IS-95-A, ANSI J-STD-008, IS-99 and IS-657, referred to herein collectively as "IS-95." A cellular telephone system configured substantially in accordance with the use of IS-95 is described in U.S. Pat. No. 5,103,459 entitled "System and Method for Generating Signal Waveforms in a CDMA Cellular Telephone System" assigned to the assignee of the present invention and incorporated herein by reference.

During operation, subscriber units 10 (typically cellular telephones) conduct communications by interfacing with base stations 12 using CDMA modulated RF signals. From base stations 12 the communications are further conducted using base stations controllers (BSC's) 14 and mobile switching centers (MSC's) 16 with public switched telephone network (PSTN) or other subscriber units 10. BSC's 14 provide call mobility functionality, as described in greater detail below, and MSC's 16 provides call routing, billing and switch interface functionality. Additionally, the data exchanged between the various systems shown in FIG. 1, including subscriber units 10 and base stations 12, are processed in frames. This data can be either traffic data which includes voice information, or signaling data which is used to configure and control the various systems shown.

The use of CDMA technology allows adjacent base stations in an IS-95 system to conduct communications over the same RF bandwidth, which increases the frequency reuse factor of the cellular telephone system when compared to other types of cellular telephone technology. When combined with extensive transmit power control, increasing the frequency reuse factor increases the efficiency with which the cellular telephone system uses the available RF bandwidth, which is one of the advantages of the IS-95 standard.

Another advantage of allowing the same RF bandwidth to be used by adjacent base stations 12 is that "soft handoff" can be used to transition a subscriber unit 10 from the coverage area of a first base station 12 to the coverage area of a second base station 12. Soft handoff involves simultaneously interfacing a subscriber unit 10 with two or more base stations as the subscriber unit transitions between the associated coverage areas of the two base stations 12. One of the subscriber units 10 shown in FIG. 1 is in soft handoff.

Soft handoff can be contrasted with hard handoff, where the interface with the first base station 12 is terminated before the link with the second base station has been established. Maintaining at least one link at all times improves the reliability and quality of the communication being conducted. A system and method for performing soft handoff is described in US described in U.S. Pat. No. 5,101,501 entitled "Method and System for Providing a Soft Handoff in Communications in a CDMA Cellular Telephone System" and U.S. Pat. No. 5,267,261 entitled "Mobile Station Assisted Soft Handoff in a CDMA Cellular Communications System" both assigned to the assignee of the present invention and incorporated herein by reference.

As noted above, BSC's 14 perform various functions that allow mobile communications to be conducted including functions that facilitate soft handoff. In particular, BSC's 14 perform "frame selection" and "frame distribution" for the set of base stations 12 involved in the soft handoff call. Frame selection is the selection of one frame for further processing from the set of frames received from the set of base stations used during a soft handoff. Frame selection maintains the highest quality link by selecting the best frame available at all times.

Frame distribution is the duplication and distribution of frames directed to the subscriber unit 10 to the set of base stations 12 involved in the call. Frame distribution allows each base station 12 to transmit a copy of the frame to the subscriber unit 10 increasing the probability of successful reception of at least one frame.

As shown in FIG. 1, subscriber unit 10A is interfacing with a single base stations 12A and is located near the coverage area of a second base station 12B. Base stations 12A and 12B, however, are coupled to different BSC's 14. This complicates the process of performing soft handoff because neither BSC 14 has access to both base stations 12A and 12B. Performing soft handoff between two base stations 12 that are controlled by two different BSC's 14 is referred to as "inter-system soft handoff." Inter-system soft handoff can be contrasted with "intra-system soft handoff" in which a soft handoff is conducted between two base stations 12 controlled by the same BSC.

For inter-system soft handoff, frame selection cannot be performed as easily because neither BSC 14 has access to the set of frames that are produced by the two base stations 12. Additionally, frame distribution is also rendered more difficult because neither BSC can transmit the set of frames generated to both base stations. Nonetheless, it is necessary to use two or more BSC's 14 in many large metropolitan areas because the number of base stations required to provide adequate coverage exceeds the capabilities of a single cellular system formed using a single BSC 14, which in turn creates the need to conduct inter-system soft handoff.

A system and method for performing an inter-system soft handoff is described in copending U.S. patent application Ser. No. 08/649,959 entitled "Inter-system Calling Supporting Inter-System Soft Handoff" assigned to the assignee of the present invention and incorporated herein by reference. In this application, a channel between the two BSC's 14 is established via an interconnect for exchanging the data necessary to perform soft handoff. Additionally, each BSC is required to either store or obtain information typically tracked within an MSC, and therefore must interact with an MSC in order to perform the soft handoff. Preferably, the interconnect is comprised of a standard T-1 or E-1 link, which are well known and therefore relatively inexpensive to implement. To establish the channel, signaling messages are exchanged between the two BSC's 14 involved in the call. As noted above, the information contained in the signaling messages require each BSC 14 to track certain information including the number of calls being conducted over the interconnect, or interact with an MSC tracking that information, and to provide the other BSC 14 with certain predefined types of information. The number of calls on the interconnect are tracked to avoid overloading the interconnect.

Requiring BSC's 14 to obtain, track or provide certain types of information, however, is highly restrictive, and can be difficult for some manufacturers of BSC's to implement. Additionally, it requires a significant degree of coordination and cooperation between BSC and MSC manufactures, which is not always feasible. Thus, a system and method of performing inter-system soft handoff that requires less cooperation and coordination between BSC's 14 and MSC's 16 would be highly desirable.

SUMMARY OF THE INVENTION

The present invention is a novel and improved method and apparatus for operating a cellular telephone system that supports performing an inter-system soft handoff. A subscriber unit generates a pilot strength measurement report when the pilot channel from a base station is detected. When a base station controller receiving the pilot strength measurement report determines that the base station is part of a second cellular telephone system, an inter-system soft handoff request is generated. An admission control subsystem receives the inter-system soft handoff request and either grants or denies the request based on the traffic level on the interconnect with the second cellular telephone system. For example, if the traffic level is too high, the inter-system soft handoff request is rejected. In a preferred embodiment of the invention, the traffic level is determined based on link load messages received periodically by the admission control subsystem that are generated by an interface port coupled to an interconnect between the first cellular telephone system and the second cellular telephone system. The link load messages include peak queue length and average frame rate information.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for operating a cellular telephone system that supports inter-system soft handoff is described. In the following description, the invention is set forth in the context of a radio frequency signal interface operating in accordance with physical signal modulation techniques of the IS-95 over-the-air protocol including the use of CDMA signal modulation. While the described invention is especially suited for use with such signal modulation techniques, the use of other wireless telecommunications protocols is consistent with the practice of the present invention including protocols that utilize CDMA signal processing techniques, or protocols that are capable of providing soft handoff functionality. Furthermore, it should be understood that the present invention is intended for use with various types of communications, including both voice based communications as well as communications during which digital data representing information other than voice is transmitted.

Throughout the application, the use and transmission of various types of information is described including data and signaling messages. It should be understood that this information is constituted by electronic representations of this data and signaling messages that are generated via the use of electric currents, voltage potentials, electromagnetic energy, or a combination thereof. Additionally, the following description contains reference to various systems for responding to, as well as manipulating and generating of, such information. In the preferred embodiment of the invention, such systems are implemented via the use of digital and analog integrated semiconductor circuits coupled to one another via various conductive connections or via the use of electromagnetic signals, or both. Also, the invention may be incorporated into satellite based wireless telecommunications systems. In other instances throughout the application, various well known systems are described in block form. This is done to avoid unnecessarily obscuring the disclosure of the present invention.

Figure 2:
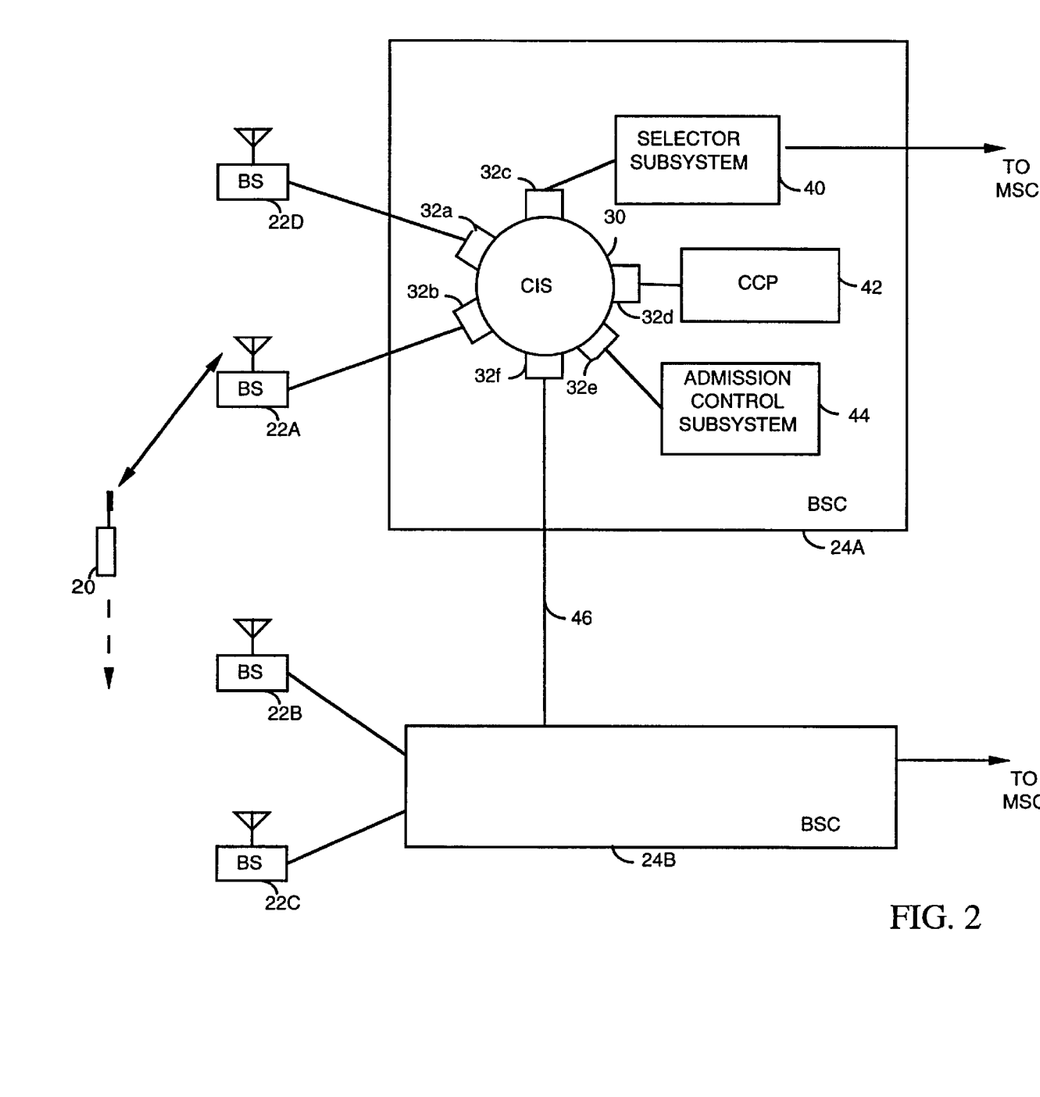
FIG. 2 is block diagram of a set of cellular telephone systems configured in accordance with one embodiment of the invention.

FIG. 2 is a block diagram of a portion of a set of cellular telephone systems configured in accordance with one embodiment of the invention. Base station controllers (BSC's) 24A and 24B are coupled to base stations 22 and to mobile switching center (MSC) 16 of FIG. 1 (MSC is not shown in FIG. 2). Subscriber unit 20 interfaces with base station 22A via RF signals modulated in accordance with the IS-95 standard, and therefore using CDMA modulation techniques. Subscriber unit 20 is shown a similar distance from base stations 22A and 22B, and therefore entering the coverage area of base station 22B. As shown in FIG. 2, base station 22A is coupled to BSC 24A and base station 22B is coupled to BSC 24B.

BSC 24A is shown in additional detail to illustrate a preferred configuration in accordance with one embodiment of the invention. CDMA interconnect subsystem (CIS) 30 is coupled to base stations 22A and 22D, selector subsystem 40, call control processor (CCP) 42, admission control subsystem 44, and interconnect 46 via base station communication network (BCN) ports 32a–32f. BCN ports 32a provides frame buffering by queuing both inbound and outbound frames. Selector 40 is coupled to MSC 16 of FIG. 1, and interconnect 46 is coupled to BSC 24B. Interconnect 46 is typically a T1 or E1 connection, the use of which is well known in the art.

During operation, the various systems that make up BSC 24A, as well as base stations 22A and 22D, exchange signaling and information using network packets that are routed by CIS 30. Each network packet contains the address of the subsystem to which it is directed. Selector subsystem 42 performs the frame selection and frame distribution functions for soft handoff as described above. CCP 42 allocates and deallocates resources for processing the call including signal processing resources within base stations 22 and selector resources within selector subsystem 40.

As described in the above referenced U.S. Pat. No. 5,267,261 patent entitled "Mobile Station Assisted Soft Handoff in a CDMA Cellular Communications System" subscriber unit 20 repeatedly searches for pilot channels generated by base stations 22, and if a pilot channel is detected at a sufficient strength and for a sufficient duration, a pilot strength measurement report (PSMR) is generated by subscriber unit 20 and transmitted to selector subsystem 40 via base station 22A and CIS 30. The PSMR indicates the set of pilot channels currently detected by the subscriber unit 20 and associated signal strengths and pilot phases.

Upon receipt of the PSMR, the selector will determine that the pilot channel from base station 22B is being detected by subscriber unit 20. Using a pilot database (PDB) located within selector subsystem 40 (not shown) the selector subsystem 40 determines that the pilot channel is from a base station coupled to BSC 24B, rather than from a base station coupled to BSC 24A, and therefore not directly accessible by selector subsystem 40. In response to this determination, the selector subsystem transmits an inter-system soft handoff request to admission control subsystem 44 specifying the BSC 24 with which the inter-system soft handoff is to be conducted.

In addition to inter-system soft handoff requests, admission control subsystem 44 also receives traffic report messages from BCN port 32f, as well as any other BCN ports 32 coupled to other BSC's 24. (Typically, BSC 24A will be coupled to several other BSC's 24, although only one is shown in FIG. 2 to facilitate understanding of the invention.) Using the traffic reports, admission control subsystem 44 either accepts or rejects the inter-system soft handoff request and indicates such to selector subsystem 40 via a signaling message. If the inter-system soft handoff request is rejected, the transfer of subscriber unit 20 to the coverage area of base station 22B may be performed using a hard handoff via the MSC.

If the inter-system soft handoff request is accepted, selector subsystem 40 transmits an inter-system soft handoff initiation message to BSC 24B, and begins to copy and transmit forward link frames directed to subscriber unit 20 to BSC 24B via interconnect 46. BSC 24B responds by instructing base station 22B to allocate signal processing resource for conducting the call, and by forwarding the forward link frames received to base station 22B which transmits the frames to subscriber unit 20 via CDMA modulated RF signals. Additionally, BSC 24B forwards reverse link frames received by base station 22B from subscriber unit 20 to BSC 24A where they are routed to selector subsystem 40 for frame selection. At this time, a steady state inter-system soft handoff has been established with a minimum of signal exchange and processing by BSC 24B. Thus, the ability of an inter-system soft handoff to be established by BSC 24A with a minimum amount of coordination and cooperation has been provided.

To allow admission control subsystem 44 to properly monitor the traffic transmitted through BCN port 32f, BCN port 32f transmits link load messages to admission control subsystem 44. In the preferred embodiment of the invention the link load messages are transmitted periodically at a period $T_{SampleLoad}$, and indicate $R_{ave}$, the average frame reception rate of BCN port, and $Q_{peak}$, the peak transmission queue length, in bytes, of BCN port 32f over the last period $T_{SampleLoad}$. In the preferred embodiment of the invention, $R_{ave}$ is the total number of good frames received by BCN port 32f from BSC 24B during the previous period $T_{SampleLoad}$ divided by the duration of the period $T_{SampleLoad}$. Additionally, $Q_{peak}$ is the peak queue length, in bytes, of BCN part 32f over the last period $T_{SampleLoad}$.

In an alternative embodiment of the invention, BCN port 32f transmits the link load messages to admission control subsystem 44 only when a change in the load conditions occurs of more than a predetermined threshold, rather than every period $T_{SampleLoad}$. This reduces the number of signaling message transmitted, and therefore increases the call processing capacity of BSC 24A.

Figure 3:
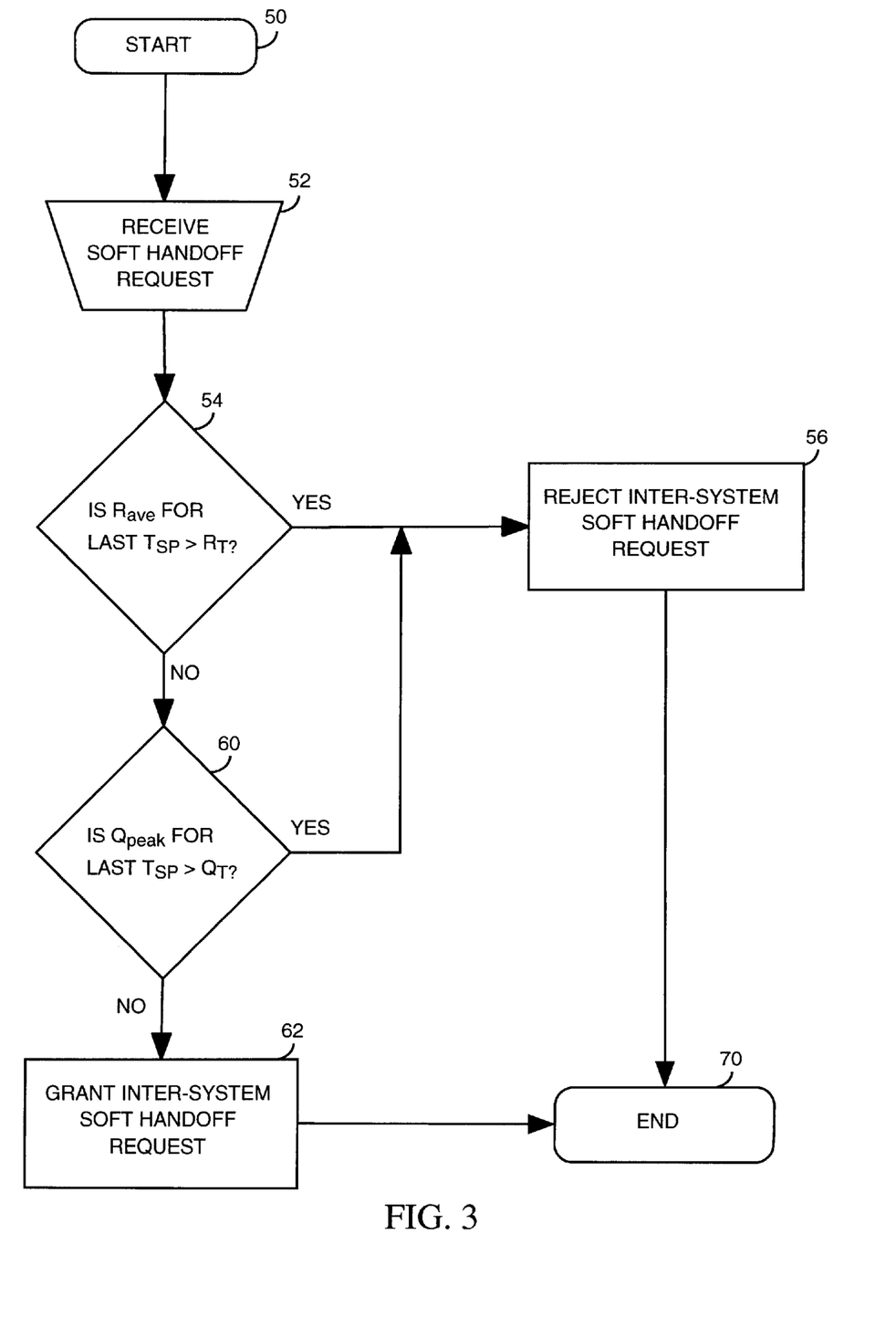
FIG. 3 is a flow chart illustrating the steps performed in granting or declining an inter-system soft handoff request when performed in accordance with one embodiment of the invention.

FIG. 3 is a flow chart illustrating the step performed by admission control subsystem 44 to determine whether to admit or reject an inter-system soft handoff request. The processing begins at step 50 and at step 52 the inter-system soft handoff request is received. At step 54 it is determined whether the average frame reception rate $R_{ave}$ is greater than a frame reception rate threshold $R_T$, and if so the inter-system soft handoff request is rejected at step 56 and the procedure terminates at step 70.

If it is determined that the average frame reception rate $R_{ave}$ is not greater than a frame reception rate threshold $R_T$, then it is determined at step 60 whether the peak transmission queue length $Q_{peak}$ is greater than a queue length threshold $Q_T$, and if so the inter-system soft handoff request is rejected at step 56 and the procedure terminates at step 70.

If it is determined that the peak queue length $Q_{peak}$ is not greater than a peak queue length threshold $Q_T$, the inter-system soft handoff is granted at step 62 and the procedure terminates at step 70.

In accordance with a preferred embodiment of the invention, the thresholds $Q_T$ and $R_T$ are set based on the data capacity of interconnect 46 and the sample period $T_{SampleLoad}$, with the preferred sample period $T_{SampleLoad}$ equal to two (2) seconds.

In a preferred embodiment of the invention the peak queue length threshold $Q_T$ is set based on the number of T-1 or E-1 connections that make up interconnect 46. If interconnect 46 is comprised of a set of MT T-1 lines, as follows:

$$Q_T=\min(3*168*M_T*0.9, \text{QUEUE\_CAPACITY}), \quad (1)$$

where the QUEUE_CAPACITY is the depth of the FIFO queue within BCN port 32f. If interconnect 46 is comprised of a set of $M_E$ E-1 lines, the peak queue length threshold $Q_T$ is set as follows:

$$Q_T=\min(3*240*M_E*0.9, \text{QUEUE\_CAPACITY}) \quad (2)$$

The threshold on the peak transmission queue length is the number of bytes that can be queued while still allowing all queued data to be transmitted with a delay of 3 ms. Keeping the queue delay less than 3 ms keeps the delay introduced by transmission of traffic frames through BCN port 32f, interconnect 46 and BSC 24B sufficiently low that the quality of the communication remains acceptable to the end user. As is well known in the art, a delay of significantly more than 100 ms are noticeable to the user. Given the necessary delay for all the other processing that must be performed, an additional delay for buffering of no more than 3 ms is preferred. Of course, the queue length must also be kept less than the queue in order to avoid losing data. In a preferred embodiment of the invention, the QUEUE_CAPACITY of BCN port 32f is three kilo-bytes (3K).

The frame reception rate threshold $R_T$ is set to as follows:

$$R_T=(50*N*0.9)/1.05, \quad (3)$$

where N is the maximum number of network packets that can be transmitted by interconnect 46 per 20 millisecond (ms) time interval. N is described in greater detail below.

The reduction to 90% (0.9) is to allow for errors and changes in the frame rate due to the 2 second sample period $T_{SampleLoad}$. The further reduction to 1/105% (1.05) is to account for signaling messages. By granting requests for inter-system soft hand-off as described above, the present invention allows inter-system soft handoff to be reliably conducted with a minimal amount of coordination between BSC's 24A and 24B, or with an MSC.

The maximum number of network packets that can be transmitted by interconnect 46 N depends on the capacity of interconnect 46 and nature of data being transmitted. In particular, the IS-95 standard provides two quality levels of telephone service are provided, with each level or service having an associated set of traffic rates, or "rate sets." The use of rate sets facilitates the generation of voice data at variable rates in response to the changes in voice activity that occur as a natural part of speech. The frame sizes of the high quality level of service, or "rate set two," service is provided in Table I, along with the probability of occurrence of each rate during a typical conversation.

TABLE I 14.4 Kbps Rate Set Frames

| Frame Type | Frame Length (Bits) | Probability |
|---|---|---|
| Full Rate | 352 | 0.291 |
| Half Rate | 208 | 0.029 |
| Fourth Rate | 136 | 0.072 |
| Eighth Rate | 104 | 0.598 |

Table II lists N (the maximum number of network packets that can be transmitted by interconnect 46) when interconnect 46 is comprised of various numbers of T-1 and E-1 links.

TABLE II

| T-1 Configuration ($M_T$) | Frames per 20 ms (N) | E-1 Configuration ($M_E$) | Frames per 20 ms (5N) |
|---|---|---|---|
| Single T-1 | 84 | Single E-1 | 130 |
| Two T-1 | 205 | Two E-1 | 315 |
| Three T-1 | 328 | Three E-1 | 470 |
| Four T-1 | 450 | Four E-1 | 660 |
| Five T-1 | 570 | Five E-1 | 820 |
| Six T-1 | 700 | | |
| Seven T-1 | 810 | | |

Referring once again to FIG. 2, if subscriber unit 20 moves completely into the coverage area of base station 22B, the RF interface with base station 22A is terminated and the call is continued completely through base station 22B. If subscriber unit 20 continues to move into the coverage area of base station 22C, a "remote" intra-system soft handoff is initiated between base stations 22B and 22C. As noted above, an intra-system soft handoff is conducted between two base stations 22 coupled to the same BSC 24B, or within the same cellular system, and an inter-system soft handoff is between two base stations 22 that are coupled to different BSC's 24 and therefore part of different cellular systems. A remote intra-system soft handoff is one conducted between two base stations 22 that are part of the same cellular telephone system, but where the frame selection and frame distribution are performed at a remote BSC 24A.

In a preferred embodiment of the invention the remote intra-system soft handoff is performed in similar fashion to that perform during initiation of the inter-system soft handoff. In particular, after receiving a pilot strength measurement report (PSMR) from subscriber unit 20 indicating the pilot channel from base station 22C has been detected, selector subsystem 40 transmits an inter-system soft handoff request to admission control subsystem 44. Admission control subsystem 44 responds by performing the steps of FIG. 3 to either grant or deny the request.

Performing the remote intra-system soft handoff as described above also increases the likelihood of proper and reliable call processing because, in order to conduct the soft handoff, selector subsystem 40 must transmit frames to both base stations 22B and 22C via interconnect 46. Additionally, selector subsystem 40 must receive frames from both base stations 22B and 22C in order to perform frame selection. The transmission of these additional frames adds to the traffic transmitted across interconnect 46, and thus performing the remote intra-system soft handoff as described above facilitates ensuring adequate capacity exist to carry such additional traffic.

Thus, a method and apparatus for operating a cellular telephone system that allows inter-system soft handoff has been described. The exemplary embodiment provided above is to enable any person skilled in the art to make or use the present invention. Various modifications consistent with the use of the invention will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for conducting an inter-system soft handoff of a call made by a subscriber unit between a first cellular system and a second cellular system, comprising the steps of:

monitoring a traffic level exchanged between the first cellular system and the second cellular system, comprising:
  monitoring a peak queue length at an interface between the first cellular system and the second cellular system; and
monitoring an average frame rate at said interface;
periodically transmitting said peak queue length and said average frame rate; and granting a soft handoff request based on said traffic level.

2. The method as set forth in claim 1 wherein said peak queue length and said average frame rate are transmitting once every 2 seconds.

3. A method for conducting an inter-system soft handoff of a call made by a subscriber unit between a first cellular system and a second cellular system, comprising the steps of:

monitoring a traffic level exchanged between the first cellular system and the second cellular system, comprising:
  monitoring a peak queue length at an interface between the first cellular system and the second cellular system; and
  monitoring an average frame rate at said interface; and
  granting a soft handoff request based on said traffic level, comprising:
    comparing said peak queue length with a queue length threshold;
    comparing said average frame rate with an average frame rate threshold; and
    granting said soft handoff request when said peak queue length is less than said queue length threshold and said average frame rate is less than said average frame rate threshold.

4. The method as set forth in claim 3 wherein, said first cellular system and said second cellular system are connected by an interconnect having an interconnect capacity, and said peak queue length threshold is set to $3*168*M_T*0.9$ when said interconnect is comprised of $M_T$ T-1 connections, and to $3*240*M_E*0.9$ when said interconnect is comprised of $M_E$ E-1 connections.

5. The method as set forth in claim 3 wherein, said first cellular system and said second cellular system are connected by an interconnect having an interconnect capacity, and said average frame rate threshold is $(50*N*0.9)/1.05$ where N represents the maximum number of network packets that can be transmitted by said interconnect per 20 ms time interval and is set based on how many T-1 or E-1 connections makeup said interconnect substantially as follows:

| T-1 Configuration ($M_T$) | Frames per 20 ms (N) | E-1 Configuration ($M_E$) | Frames per 20 ms (5N) |
|---|---|---|---|
| Single T-1 | 84 | Single E-1 | 130 |
| Two T-1 | 205 | Two E-1 | 315 |
| Three T-1 | 328 | Three E-1 | 470 |
| Four T-1 | 450 | Four E-1 | 660 |
| Five T-1 | 570 | Five E-1 | 820 |
| Six T-1 | 700 | | |
| Seven T-1 | 810 | | |

6. A cellular telephone system capable of conducting an inter-system soft handoff with a second cellular telephone system comprising:
   a cellular system interface port for monitoring a traffic level exchanged with the second cellular telephone system, wherein said cellular system interface port is further for monitoring a peak queue length of traffic exchanged between the cellular system and the second cellular system, and monitoring an average frame rate at said cellular system interface port;
   a selector for initiating an inter-system soft handoff; and
   an admission control subsystem for admitting said inter-system soft handoff or rejecting said inter-system soft handoff based on said traffic level.

7. A cellular telephone system capable of conducting an inter-system soft handoff with a second cellular telephone system comprising:
   a cellular system interface port for monitoring a traffic level exchanged with the second cellular telephone system, wherein said cellular system interface port is further for potentially transmitting said peak queue length and said average frame rate;
   a selector for initiating an inter-system soft handoff; and
   an admission control subsystem for admitting said inter-system soft handoff or rejecting said inter-system soft handoff based on said traffic level.

8. The cellular telephone system as set forth in claim 7 wherein said peak queue length and said average frame rate are transmitting once every 2 seconds.

9. A cellular telephone system capable of conducting an inter-system soft handoff with a second cellular telephone system comprising:
   a cellular system interface port for monitoring a traffic level exchanged with the second cellular telephone system, wherein said cellular system interface port is further for monitoring a peak queue length of traffic exchanged between the cellular system and the second cellular system, and monitoring an average frame rate at said cellular system interface port;
   a selector for initiating an inter-system soft handoff; and
   an admission control subsystem for admitting said inter-system soft handoff or rejecting said inter-system soft handoff based on said traffic level, wherein said admission control subsystem is further for comparing said peak queue length with a queue length threshold, and granting said inter-system soft handoff when said peak queue length is less than said queue length threshold.

10. A cellular telephone system capable of conducting an inter-system soft handoff with a second cellular telephone system comprising:
   a cellular system interface port for monitoring a traffic level exchanged with the second cellular telephone system, wherein said cellular system interface port is further for monitoring a peak queue length of traffic exchanged between the cellular system and the second cellular system, and monitoring an average frame rate at said cellular system interface port;
   a selector for initiating an inter-system soft handoff; and
   an admission control subsystem for admitting said inter-system soft handoff or rejecting said inter-system soft handoff based on said traffic level, wherein said admission control subsystem is further for comparing said peak queue length with a queue length threshold, comparing said average frame rate with an average frame rate threshold, and granting said inter-service soft handoff when said peak queue length is less than said queue length threshold and said average frame rate is less than said average frame rate threshold.

11. The cellular telephone system as set forth in claim 10 wherein, said cellular system and said second cellular system are connected by an interconnect having an interconnect capacity, and said average frame rate threshold is $(50*N*0.9)/1.05$ where N represents the maximum number of network packets that can be transmitted by said interconnect per 20 ms time interval and is set based on how many T-1 or E-1 connections makeup said interconnect substantially as follows:

| T-1 Configuration ($M_T$) | Frames per 20 ms (N) | E-1 Configuration ($M_E$) | Frames per 20 ms (5N) |
|---|---|---|---|
| Single T-1 | 84 | Single E-1 | 130 |
| Two T-1 | 205 | Two E-1 | 315 |
| Three T-1 | 328 | Three E-1 | 470 |
| Four T-1 | 450 | Four E-1 | 660 |
| Five T-1 | 570 | Five E-1 | 820 |
| Six T-1 | 700 | | |
| Seven T-1 | 810 | | |

12. A cellular telephone system capable of conducting an inter-system soft handoff with a second cellular telephone system comprising:
   a cellular system interface port for monitoring a traffic level exchanged with the second cellular telephone system, wherein said cellular system interface port is further for monitoring a peak queue length of traffic exchanged between the cellular system and the second cellular system, and monitoring an average frame rate at said cellular system interface port;
   a selector for initiating an inter-system soft handoff; and
   an admission control subsystem for admitting said inter-system soft handoff or rejecting said inter-system soft handoff based on said traffic level,
   wherein said cellular system and said second cellular system are connected by an interconnect having an interconnect capacity, and said peak queue length threshold is set to $3*168*M_T*0.9$ when said interconnect is comprised of $M_T$ T-1 connections, and to $3*240*M_E*0.9$ when said interconnect is comprised of $M_E$ E-1 connections.

13. A method for conducting an inter-system soft handoff of a call made by a subscriber unit between a first cellular system and a second cellular system, comprising the steps of:

a) monitoring a traffic level exchanged between the first cellular system and the second cellular system; and b) granting a soft handoff request based on said traffic level, wherein the first cellular system includes a first base station controller that services a first set of one or more base stations in the first cellular system, the second cellular system includes a second base station controller that services a second set of one or more base stations in the second cellular system, and step a) further comprises monitoring the traffic level exchanged on a link between the first base station controller and the second base station controller.

14. The method as set forth in claim 13 wherein the link is a direct connection between the first base station controller and the second base station controller.

* * * * *

UNITED STATES PATENT AND TRADEMARK OFFICE
CERTIFICATE OF CORRECTION

PATENT NO. : 6,002,933
DATED : December 14, 1999
INVENTOR(S) : Bender et al.

It is certified that error appears in the above-identified patent and that said Letters Patent is hereby corrected as shown below:

Column 9,
Line 49, change "potentially" to -- periodically --.

Column 10,
Line 26, change "inter-service" to -- inter-system --.

Signed and Sealed this

Twenty-fourth Day of August, 2004

JON W. DUDAS
*Director of the United States Patent and Trademark Office*